US012510848B2

(12) United States Patent
Nagashima

(10) Patent No.: US 12,510,848 B2
(45) Date of Patent: Dec. 30, 2025

(54) DEVELOPING DEVICE HAVING A RESIN REPLACEMENT AREA, IMAGE FORMING APPARATUS, AND METHOD FOR MANUFACTURING DEVELOPING DEVICE

(71) Applicant: KYOCERA Document Solutions Inc., Osaka (JP)

(72) Inventor: Teruhiko Nagashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/935,056

(22) Filed: Nov. 1, 2024

(65) Prior Publication Data

US 2025/0147452 A1 May 8, 2025

(30) Foreign Application Priority Data

Nov. 8, 2023 (JP) ................................ 2023-190677

(51) Int. Cl.
*G03G 15/08* (2006.01)

(52) U.S. Cl.
CPC ..... *G03G 15/0898* (2013.01); *G03G 15/0808* (2013.01); *G03G 15/0812* (2013.01); *G03G 15/0865* (2013.01); *G03G 15/0881* (2013.01); *G03G 15/0896* (2013.01); *G03G 15/0817* (2013.01); *G03G 2215/00991* (2013.01); *G03G 2215/0869* (2013.01); *G03G 2221/1648* (2013.01)

(58) Field of Classification Search
CPC ........... G03G 15/0898; G03G 15/0808; G03G 15/0812; G03G 15/0817; G03G 15/0881; G03G 15/0896; G03G 15/0865; G03G 2215/0869; G03G 2215/00991; G03G 2221/1648
See application file for complete search history.

(56) References Cited

U.S. PATENT DOCUMENTS

| | | | | |
|---|---|---|---|---|
| 2006/0291895 | A1 | 12/2006 | Fukuta et al. | 399/103 |
| 2008/0025766 | A1 | 1/2008 | Fukuta | 399/284 |
| 2011/0286762 | A1* | 11/2011 | Hoshi | G03G 15/0894 399/105 |
| 2013/0129378 | A1* | 5/2013 | Hoshi | G03G 21/0029 399/106 |

(Continued)

FOREIGN PATENT DOCUMENTS

JP 2019-66740 A 4/2019

OTHER PUBLICATIONS

Extended European Search Report dated Mar. 17, 2025, issued by the European Patent Office in corresponding application EP 24210526.0.

*Primary Examiner* — Joseph S Wong
(74) *Attorney, Agent, or Firm* — Stein IP LLC

(57) ABSTRACT

A developing device includes a developing container, a developing roller, a regulating blade, a seal member, and a resin member. The regulating blade includes a mounting plate and a blade plate. The developing container has a facing part facing a step part due to thickness difference between the mounting plate and the blade plate. The seal member has a resin placement area, and is squeezed between the regulating blade and the facing part. The resin placement area is an area that penetrates the seal member and is surrounded by the seal member. The resin placement area overlaps the step part.

8 Claims, 14 Drawing Sheets

(56) References Cited

U.S. PATENT DOCUMENTS

| | | | | |
|---|---|---|---|---|
| 2014/0093271 A1* | 4/2014 | Hoshi | ................ | G03G 21/1803 399/103 |
| 2019/0101851 A1 | 4/2019 | Fujiwara et al. | .. | G03G 15/0898 |

* cited by examiner

DEVELOPING DEVICE HAVING A RESIN REPLACEMENT AREA, IMAGE FORMING APPARATUS, AND METHOD FOR MANUFACTURING DEVELOPING DEVICE

INCORPORATION BY REFERENCE

This application is based upon and claims the benefit of priority from the corresponding Japanese Patent Application No. 2023-190677 filed Nov. 8, 2023, the entire contents of which are hereby incorporated by reference.

BACKGROUND

The present disclosure relates to a developing device, an image forming apparatus, and a method for manufacturing a developing device.

A conventional developing device stores toner in a developing container. The developing container supports a developing roller in a rotatable manner. The developing roller carries the toner on its outer circumferential surface and rotates. In addition, the developing container is equipped with a regulating blade. The regulating blade regulates thickness of the toner layer on the developing roller.

SUMMARY

A developing device according to a first aspect of the present disclosure includes a developing container, a developing roller, a regulating blade, a seal member, and a resin member. The developing container stores developer containing toner. The developing roller is supported by the developing container and is capable of rotating about an axis extending in parallel to a first direction, so as to feed the toner to an image carrier, by carrying the toner on its outer circumferential surface and rotating. The regulating blade is attached to the developing container, and has a plate-like shape whose longitudinal direction is the first direction. The regulating blade allows an end part opposite to the side attached to the developing container to make a surface contact with the outer circumferential surface of the developing roller, so as to regulate thickness of the toner layer formed on the outer circumferential surface of the developing roller. The seal member is made of elastic material so as to seal a gap between the developing container and the regulating blade. The resin member is formed by curing liquid resin. The regulating blade includes a mounting plate and a blade plate. The mounting plate is attached to the developing container. The blade plate is made of a sheet material thinner than the mounting plate. The blade plate is joined to one surface of the mounting plate, and protrudes from the mounting plate in a second direction parallel to the one surface and perpendicular to the first direction, so as to make a surface contact with the outer circumferential surface of the developing roller. The developing container has a facing part that faces a step part of the regulating blade, which includes a step due to a thickness difference between the mounting plate and the blade plate, in a third direction perpendicular to the first direction and the second direction. The seal member has a resin placement area in which the resin member is disposed, at an end part in the first direction, and is squeezed and disposed between the regulating blade and the facing part in the third direction. The resin placement area is an area that penetrates the seal member in the third direction and is surrounded by a constituent material of the seal member from the first direction and the second direction. The resin placement area is disposed at a position overlapping the step part.

An image forming apparatus according to a second aspect of the present disclosure includes the developing device described above.

A method for manufacturing a developing device according to a third aspect of the present disclosure is a method for manufacturing a developing device including: a developing container for storing developer containing toner; a developing roller supported by the developing container in a rotatable manner about an axis extending in parallel to a first direction, so as to feed the toner to an image carrier by carrying the toner on its outer circumferential surface and rotating; a regulating blade attached to the developing container, the regulating blade having a plate-like shape whose longitudinal direction is the first direction, the regulating blade allowing an end part opposite to the side attached to the developing container to make a surface contact with the outer circumferential surface of the developing roller, so as to regulate thickness of the toner layer formed on the outer circumferential surface of the developing roller; a seal member made of elastic material so as to seal a gap between the developing container and the regulating blade; and a resin member formed by curing liquid resin. The regulating blade includes a mounting plate attached to the developing container, and a blade plate made of a sheet material thinner than the mounting plate. The blade plate is joined to one surface of the mounting plate, and protrudes from the mounting plate in a second direction parallel to the one surface and perpendicular to the first direction, so as to make a surface contact with the outer circumferential surface of the developing roller. The developing container has a facing part that faces a step part of the regulating blade, which includes a step due to a thickness difference between the mounting plate and the blade plate, in a third direction perpendicular to the first direction and the second direction. The method includes the steps of: disposing the seal member between the regulating blade and the facing part in the third direction, so that the seal member has a resin placement area in which the resin member is disposed, at an end part in the first direction, and that the resin placement area is an area that penetrates the seal member in the third direction and is surrounded by a constituent material of the seal member from the first direction and the second direction, and that the resin placement area overlaps the step part; squeezing the seal member in the third direction by attaching the regulating blade to the developing container; and forming the resin member by filling and curing liquid resin in the resin placement area.

DETAILED DESCRIPTION

Hereinafter, a structure of an image forming apparatus is described, which includes a developing device according to one embodiment of the present disclosure. In the following description, a tandem type color printer is exemplified for convenience sake. However, the present disclosure can be applied not only to a color printer but also to a monochrome printer. In addition, the present disclosure can be applied to other image forming apparatus different from a printer, such as a copier, a facsimile machine, or a multifunction peripheral having those functions.

Overall Structure of Image Forming Apparatus

Figure 1:
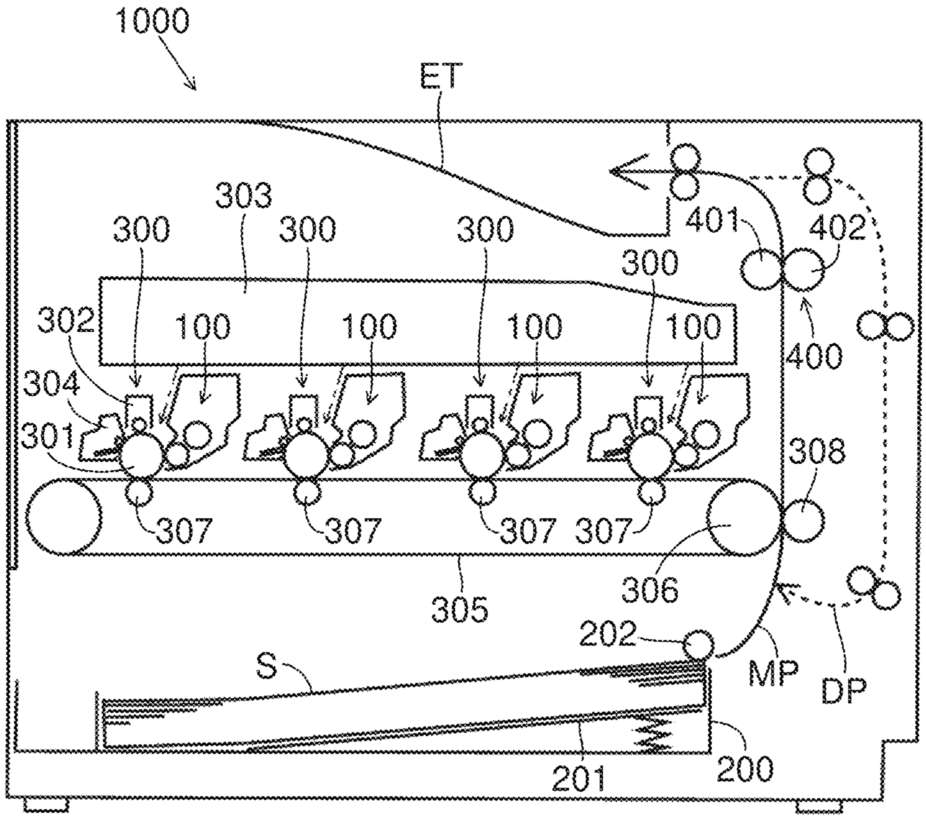
FIG. 1 is a schematic diagram of an image forming apparatus according to one embodiment.

As illustrated in FIG. 1, an image forming apparatus 1000 of this embodiment includes a developing device 100. The developing device 100 forms a toner image. In other words, the developing device 100 feeds toner to an electrostatic latent image so as to develop the same. A structure of the developing device 100 will be described later in detail.

The image forming apparatus 1000 includes a main conveying path MP. In FIG. 1, the main conveying path MP is schematically illustrated by a solid arrow. A duplex printing conveying path DP, which will be described later, is schematically illustrated by a broken arrow.

The image forming apparatus 1000 includes a paper feed cassette 200. The paper feed cassette 200 is attachable and detachable from a main body of the image forming apparatus 1000. The paper feed cassette 200 stores sheets. In FIG. 1, the sheet in the paper feed cassette 200 is denoted by S. The image forming apparatus 1000 feeds the sheet in the paper feed cassette 200 to the main conveying path MP, and conveys the sheet along the main conveying path MP. Further, the image forming apparatus 1000 performs printing on the sheet that is being conveyed. As the sheet that is used by the image forming apparatus 1000 for printing, there are copy paper, coated paper, OHP sheets, cardboard, postcards, tracing paper, and the like.

Inside the paper feed cassette 200, a lift plate 201 is disposed. Inside the paper feed cassette 200, the sheets are placed on the lift plate 201. The lift plate 201 pivots about a fulcrum at one end (i.e., an upstream side in a paper feed direction or a rear end side of the sheet), so that the other end (i.e., a downstream side in the paper feed direction or a front end side of the sheet) moves up and down.

On the downstream side of the paper feed cassette 200 in the paper feed direction (at a sheet feed port), a paper feed roller 202 is disposed. When the lift plate 201 moves upward, the sheet on the lift plate 201 contacts the outer circumferential surface of the paper feed roller 202. The paper feed roller 202 rotates in contact with the sheet. In this way, the paper feed cassette 200 sends out the sheet.

The image forming apparatus 1000 includes four image forming units 300 corresponding to cyan, magenta, yellow, and black colors, respectively. Each of the image forming units 300 forms a toner image of the corresponding color. In the following description, one of the image forming units 300 is noted, and its structure is described. The individual image forming units 300 have the same basic structure, and hence descriptions of structures of other image forming units 300 are omitted by referring to the following description.

The image forming unit 300 includes a photosensitive drum 301, a charging device 302, an exposure device 303, and a cleaning device 304. The photosensitive drum 301 corresponds to an "image carrier". The developing device 100 is a component of the image forming unit 300.

The photosensitive drum 301 is supported in a rotatable manner. The charging device 302 charges the outer circumferential surface of the photosensitive drum 301. The exposure device 303 forms an electrostatic latent image on the outer circumferential surface of the photosensitive drum 301. The developing device 100 develops the electrostatic latent image on the outer circumferential surface of the photosensitive drum 301 into a toner image. The cleaning device 304 cleans the outer circumferential surface of the photosensitive drum 301.

The image forming apparatus 1000 includes an intermediate transfer belt 305. The intermediate transfer belt 305 is an endless belt. The intermediate transfer belt 305 is stretched around a plurality of rollers including a drive roller 306 (the other roller is not denoted by a reference numeral), and is supported in a rotatable manner. The intermediate transfer belt 305 contacts the outer circumferential surface of the photosensitive drum 301 and rotates in this state. The drive roller 306 is supplied with driving force from a belt motor (not shown) so as to rotate. When the drive roller 306 rotates, the intermediate transfer belt 305 is driven to rotate.

The image forming apparatus 1000 includes primary transfer rollers 307. The primary transfer rollers 307 are assigned to cyan, magenta, yellow, and black colors, respectively. The primary transfer rollers 307 are disposed on the inner periphery side of the intermediate transfer belt 305. Each of the primary transfer rollers 307 is disposed to face the photosensitive drum 301 of the corresponding color via the intermediate transfer belt 305.

The image forming apparatus 1000 includes a secondary transfer roller 308. The secondary transfer roller 308 is pressed to contact the outer circumferential surface of the intermediate transfer belt 305, so as to form a transfer nip between itself and the intermediate transfer belt 305. The main conveying path MP passes through the transfer nip.

Each of the primary transfer rollers 307 primarily transfers the toner image of the corresponding color from the photosensitive drum 301 to the outer circumferential surface of the intermediate transfer belt 305. The intermediate transfer belt 305 carries the toner image on its outer circumferential surface and rotates. The secondary transfer roller 308 forms a transfer electric field between itself and the intermediate transfer belt 305, so as to secondarily transfer the toner image to the sheet that is passing through the transfer nip.

In addition, the image forming apparatus 1000 includes a fixing unit 400. The fixing unit 400 includes a fixing roller 401 and a pressure roller 402. The fixing roller 401 has a heater embedded inside. The pressure roller 402 is pressed to contact the fixing roller 401, so as to form a fixing nip between itself and the fixing roller 401.

During printing by the image forming apparatus 1000, the sheet fed from the paper feed cassette 200 is conveyed and enters the transfer nip. Further, when the sheet passes through the transfer nip, printing on the sheet is performed. In this case, the toner image on the outer circumferential surface of the photosensitive drum 301 is transferred to the sheet. After that, the sheet enters the fixing nip, and the sheet is heated and pressed. In this way, the toner image is fixed to the sheet. The sheet after printing is discharged onto a discharge tray ET.

Besides a one-side printing job, i.e., printing a toner image only on one side of the sheet, the image forming apparatus 1000 can perform a duplex printing job, i.e., printing toner images on both sides of the sheet, as a print job. To perform the duplex printing job, the image forming apparatus 1000 includes a duplex printing conveying path DP.

The duplex printing conveying path DP branches off from the main conveying path MP on the downstream side of the fixing nip in the sheet conveying direction. Further, the duplex printing conveying path DP joins the main conveying path MP on the upstream side of the transfer nip in the sheet conveying direction.

If the executing job is the one-side printing job, the sheet passes through the transfer nip only once, and the transferring process is performed once to the sheet that is passing through the transfer nip. After the first transferring process, the sheet is discharged as it is onto the discharge tray ET.

If the executing job is the duplex printing job, the transferring process is performed once to each of the front and back sides of the sheet, and hence the sheet passes through the transfer nip twice. Specifically, when the sheet passes through the transfer nip first time, the transferring process is performed to one surface of the sheet. After the first transferring process, before the sheet is completed discharged onto the discharge tray ET after the rear end of the sheet has passed the fixing nip, the sheet is switched back. In this way, the sheet is pulled into the duplex printing conveying path DP from the rear end.

After that, the sheet is conveyed along the duplex printing conveying path DP. Further, the sheet is returned to the main conveying path MP on the upstream side of the transfer nip in the sheet conveying direction. After returning to the main conveying path MP, the sheet passes through the transfer nip again. At this time, the front and back sides of the sheet are reversed from the last time the sheet passed through the transfer nip. In this way, when the sheet passes through the transfer nip second time, the transferring process is performed to the other surface opposite to the one surface of the sheet.

Structure of Developing Device

Figure 2:
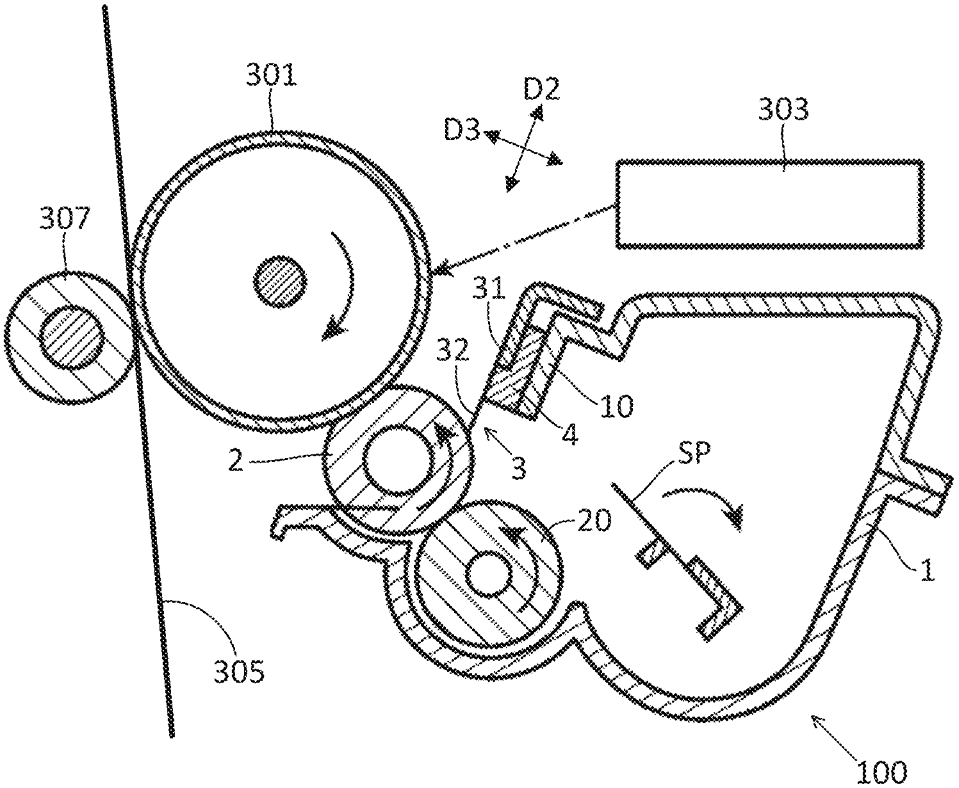
FIG. 2 is a schematic diagram of a developing device according to one embodiment.

As illustrated in FIG. 2, the developing device 100 includes a developing container 1. The developing container 1 stores developer containing toner. In other words, the developing container 1 has a storage space inside. Note that the developer stored in the developing container 1 is non-magnetic one-component developer containing only the toner.

In the storage space of the developing container 1, a stirring puddle SP is disposed. The stirring puddle SP stirs the toner in the storage space. Note that a not-shown toner replenishment device replenishes the toner from a toner container to the storage space.

The developing container 1 has an opening on the side on which the photosensitive drum 301 is disposed. The opening of the developing container 1 is a toner feed opening to the photosensitive drum 301.

The developing device 100 includes a developing roller 2 and a feed roller 20. The feed roller 20 and the developing roller 2 are arranged side by side in this order from the inside to the outside of the developing container 1. The developing roller 2 is disposed so that its outer circumferential surface faces the outer circumferential surface of the feed roller 20, and that its outer circumferential surface faces the outer circumferential surface of the photosensitive drum 301. In other words, the developing roller 2 is disposed between the feed roller 20 and the photosensitive drum 301. In further other words, the developing roller 2 is disposed at the opening of the developing container 1, while the feed roller 20 is disposed inside the developing container 1.

The feed roller 20 is supported by the developing container 1 in a rotatable manner. When printing is performed, the feed roller 20 rotates in one direction (a counterclockwise direction in FIG. 2). In addition, the feed roller 20 carries the toner in the storage space on its outer circumferential surface. The feed roller 20 carries the toner on its outer circumferential surface and rotates, so as to feed the toner to the developing roller 2.

The developing roller 2 is supported by the developing container 1 in a rotatable manner. When printing is performed, the developing roller 2 rotates in the same direction as the feed roller 20 (in the counterclockwise direction in FIG. 2). As a result, moving directions of the outer circumferential surfaces of the developing roller 2 and the feed roller 20 are opposite to each other, at the position where the developing roller 2 and the feed roller 20 face each other.

Each of the developing roller 2 and the feed roller 20 can rotate about an axis extending in parallel to a first direction D1. In FIG. 2, the direction perpendicular to the paper is the first direction D1.

The developing roller 2 receives the toner fed from the feed roller 20, and carries the toner on its outer circumferential surface. The developing roller 2 carries the toner on its outer circumferential surface and rotates, so as to feed the toner to the photosensitive drum 301. In order to efficiently transfer the toner from the developing roller 2 to the photosensitive drum 301, it is preferred to apply a predetermined developing voltage to the developing roller 2.

The developing roller 2 includes a rotation shaft (without a reference numeral) and a roller member (without a reference numeral). The rotation shaft extends in parallel to the first direction D1. The roller member is a cylindrical member and is attached to the rotation shaft. The roller member rotates together with the rotation shaft.

For instance, the roller member has a base rubber (such as silicone rubber). On the surface of the base rubber, a coat layer is formed using a rough coat material such as polyurethane. In other words, the developing roller 2 has the rough outer circumferential surface. In this way, the toner is carried on the outer circumferential surface of the developing roller 2. On the outer circumferential surface of the developing roller 2, a toner layer is formed.

In addition, the developing device 100 includes a regulating blade 3. The regulating blade 3 is a plate-like member. The regulating blade 3 is made of sheet metal. The regulating blade 3 is formed by machining a metal sheet. The regulating blade 3 is a combination of two metal sheets having different thicknesses.

The regulating blade 3 has a longitudinal direction in the first direction D1. In other words, the regulating blade 3 has the longitudinal direction parallel to an axis direction of the developing roller 2. The regulating blade 3 extends from one end side to the other end side in the axis direction of the developing roller 2.

The regulating blade 3 is attached to the developing container 1. The regulating blade 3 extends from the side attached to the developing container 1 toward the developing roller 2. The regulating blade 3 allows an end part, which is opposite to the side attached to the developing container 1, to make a surface contact with the outer circumferential surface of the developing roller 2.

The regulating blade 3 makes surface contact with the outer circumferential surface of the developing roller 2, on the upstream side of the facing position between the developing roller 2 and the photosensitive drum 301, in a rotation direction of the developing roller 2. The regulating blade 3 makes surface contact with the outer circumferential surface of the developing roller 2, so as to regulate thickness of the toner layer formed on the outer circumferential surface of the developing roller 2. Note that the width in the first direction D1 of a part of the regulating blade 3, which makes surface contact with the outer circumferential surface of the developing roller 2, is larger than the maximum developing width of the developing roller 2.

Structure of Regulating Blade

Figure 3:
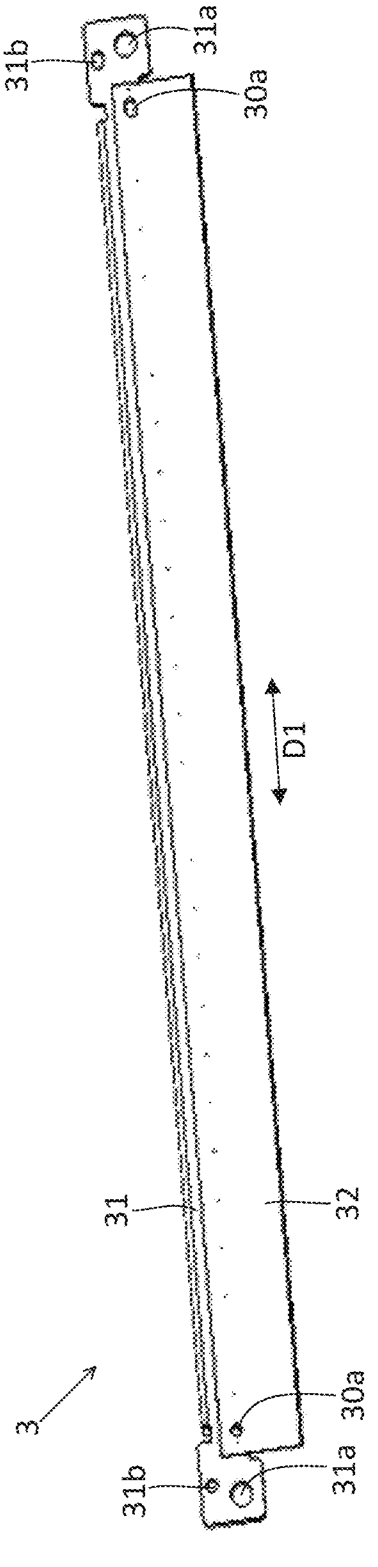
FIG. 3 is a perspective view of a regulating blade according to one embodiment.
Figure 4:
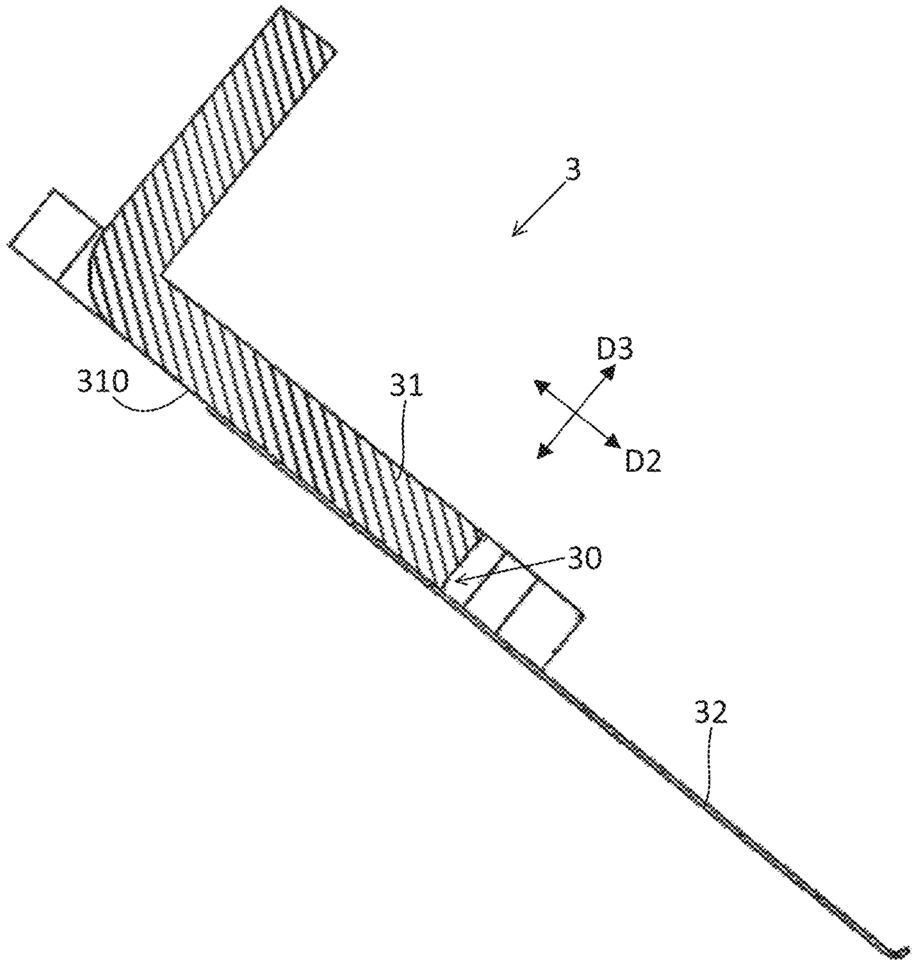
FIG. 4 is a cross-sectional view of the regulating blade according to one embodiment.

The regulating blade 3 has a structure as illustrated in FIGS. 3 and 4. Note that FIG. 4 corresponds to a cross section of the regulating blade 3 illustrated in FIG. 3, taken along a plane perpendicular to the first direction D1.

The regulating blade 3 includes a mounting plate 31 and a blade plate 32. The mounting plate 31 and the blade plate 32 are each made of a sheet metal. The mounting plate 31 is made of a sheet material having a predetermined thickness. The blade plate 32 is made of a sheet material thinner than that of the mounting plate 31.

Figure 5:
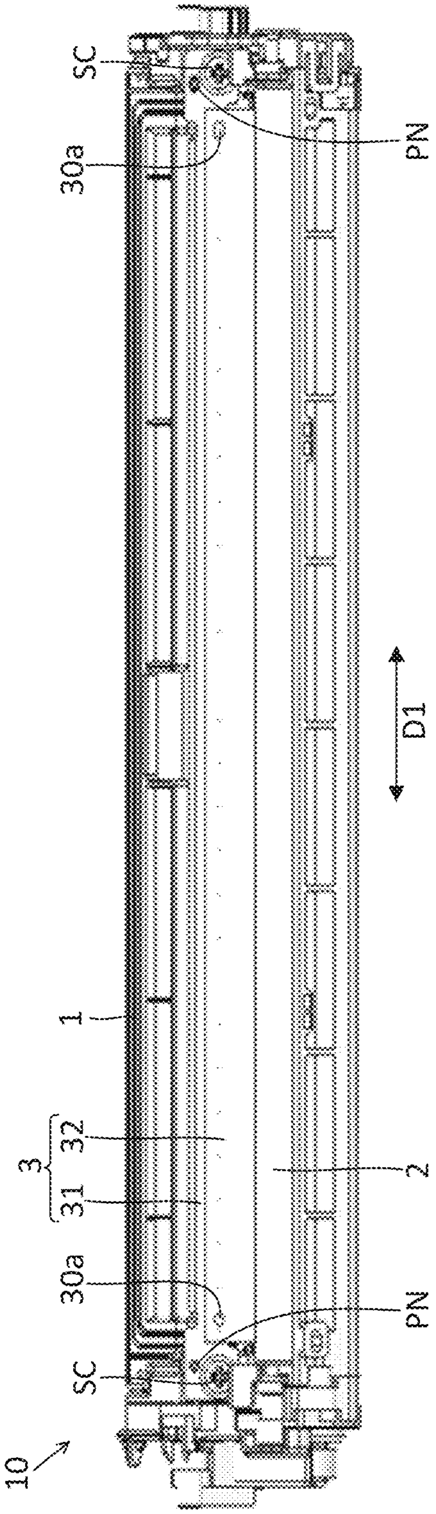
FIG. 5 is a plan view of the developing device according to one embodiment, viewed from a photosensitive drum side.
Figure 6:
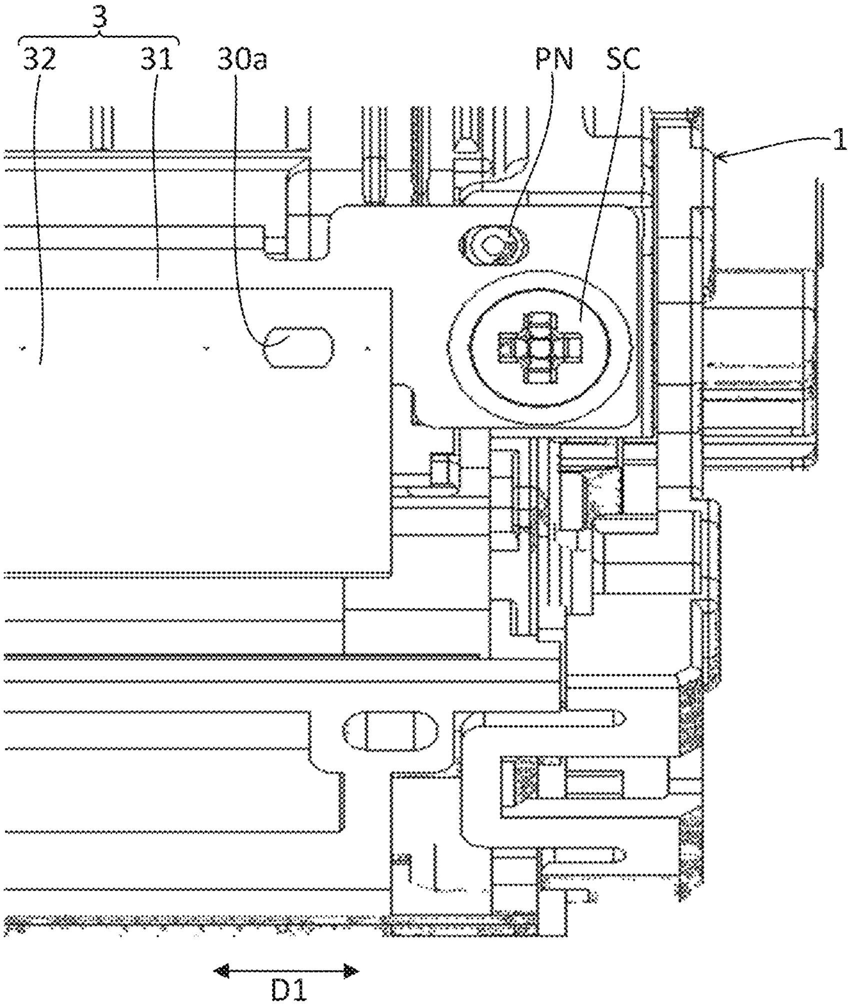
FIG. 6 is an enlarged view of a mounting part and its vicinity of the regulating blade to a developing container according to one embodiment.

The mounting plate 31 is attached to the developing container 1. When the mounting plate 31 is attached to the developing container 1, the regulating blade 3 is attached to the developing container 1. An attaching structure of the regulating blade 3 to the developing container 1 is illustrated in FIGS. 5 and 6.

The mounting plate 31 is a part of a metal plate that is bent in an L-shape. One side part of the L-shaped metal plate with respect to a bending part (bending line) functions as the mounting plate 31. The mounting plate 31 is fastened to the developing container 1 using a fastening member SC such as a screw. Specifically, the mounting plate 31 has a fastening hole 31*a* penetrating in the thickness direction. The fastening member SC is inserted in the fastening hole 31*a* and is engaged in a screw hole (not shown) of the developing container 1. In this way, the regulating blade 3 is attached to the developing container 1. In this structure, the fastening hole 31*a* corresponds to a "fastening part".

In addition, the mounting plate 31 has a positioning hole 31*b* penetrating in the thickness direction. In the state where the mounting plate 31 is attached to the developing container 1, a positioning pin PN of the developing container 1 is inserted in the positioning hole 31*b*. In this way, the regulating blade 3 is positioned to the developing container 1. In this structure, the positioning hole 31*b* corresponds to a "positioning part".

The blade plate 32 is joined to one surface 310 of the mounting plate 31. The blade plate 32 protrudes from the mounting plate 31 in a second direction D2 that is parallel to the one surface 310 and is perpendicular to the first direction D1. In this way, one end of the blade plate 32 in the second direction D2 is a fixed end, while the other end in the second direction D2 is a free end. Note that the second direction D2 corresponds to a short direction perpendicular to the longitudinal direction of the regulating blade 3.

The one end part of the blade plate 32 in the second direction D2 is joined (i.e., fixed) to the one surface 310 of the mounting plate 31. For instance, as a method of joining the blade plate 32 to the mounting plate 31, a spot welding method is used. However, other method may be used to join the blade plate 32 to the mounting plate 31. The other end part of the blade plate 32 in the second direction D2 makes surface contact with the outer circumferential surface of the developing roller 2. For instance, the other end part of the blade plate 32 in the second direction D2 is curved in the direction separating from the outer circumferential surface of the developing roller 2. Further, the curved part of the other end part of the blade plate 32 in the second direction D2 makes surface contact with the outer circumferential surface of the developing roller 2.

In this way, the regulating blade 3 is constituted of two metal sheets having different thicknesses (i.e., the mounting plate 31 and the blade plate 32). In this structure, due to a thickness difference between the mounting plate 31 (thicker plate) and the blade plate 32 (thinner plate), the regulating blade 3 has a step. In the following description, a part of the regulating blade 3, which has the step due to the thickness difference between the mounting plate 31 and the blade plate 32, is denoted by 30 and is referred to as a step part 30.

Figure 7:
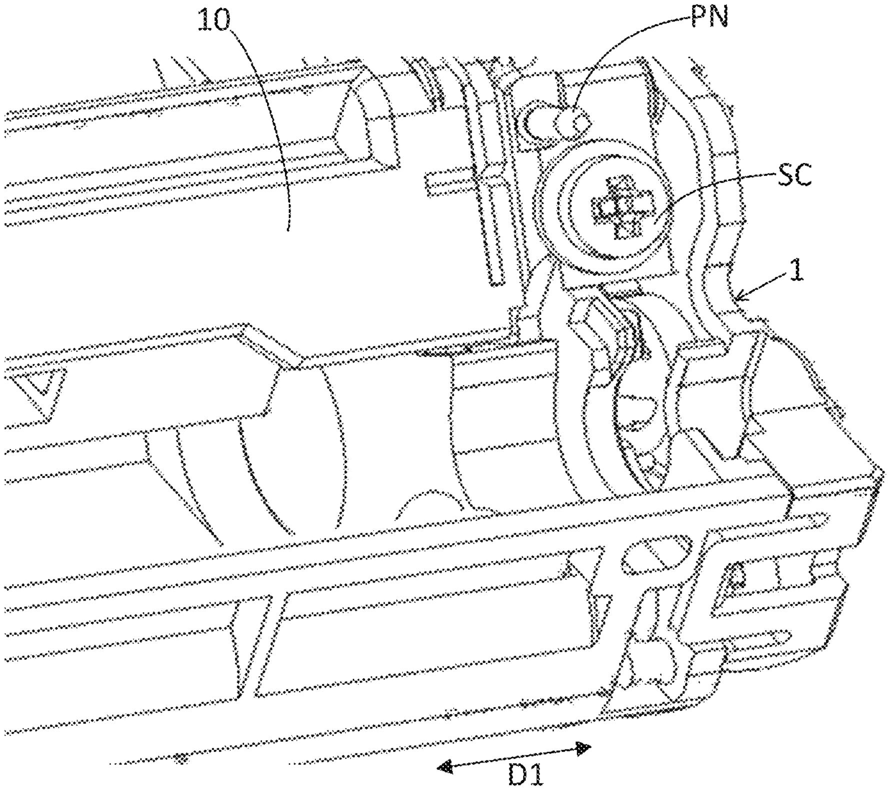
FIG. 7 is an enlarged perspective view of a facing part and its vicinity of the developing container according to one embodiment.
Figure 8:
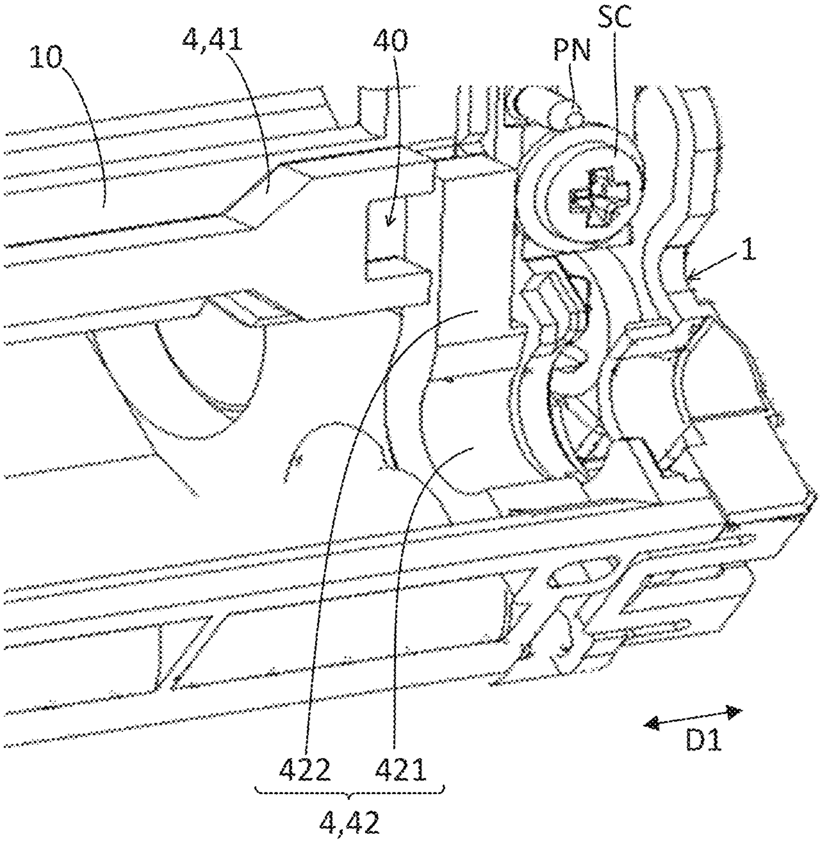
FIG. 8 is a diagram illustrating the developing container illustrated in FIG. 7, in which a seal member is disposed.

Note that, in the state where the regulating blade 3 is attached to the developing container 1, a part of the developing container 1 faces the step part 30 of the regulating blade 3, in a third direction D3 that is perpendicular to the first direction D1 and the second direction D2. In other words, the developing container 1 has a facing part 10 that faces the step part 30 in the third direction D3 (see FIG. 7). The thickness direction of the step part 30 of the regulating blade 3 is identical to the facing direction between the step part 30 and the facing part 10 (i.e., the third direction D3).

Structure of Seal Member

If a gap between the regulating blade 3 and the facing part 10 in the third direction D3 is large, the toner passes through in the second direction D2 between the regulating blade 3 and the facing part 10 in the third direction D3. When the toner passes through in the second direction D2 between the regulating blade 3 and the facing part 10 in the third direction D3, the toner may leak from the inside to the outside of the developing container 1. The leakage of the toner can be suppressed if the regulating blade 3 is brought into intimate contact with the facing part 10, but it is difficult to bring the regulating blade 3 into intimate contact with the facing part 10. In addition, on the end sides of the developing roller 2 in the first direction D1, the toner may pass through a gap between the developing container 1 and the developing roller 2 in the first direction D1, so as to leak from the inside to the outside of the developing container 1.

In order to suppress such an inconvenience, the developing device 100 includes a seal member 4 as illustrated in FIGS. 8 to 11. The seal member 4 seals a gap generated between the developing container 1 and the regulating blade 3. The seal member 4 is squeezed and disposed between the regulating blade 3 and the facing part 10 in the third direction D3.

The seal member 4 includes a back seal member 41 and end part seal members 42. The back seal member 41 and the end part seal members 42 are separated from each other. The back seal member 41 and the end part seal members 42 are made of an elastic material such as polyurethane foam, though this is not a limitation. Other elastic material may be used as a constituent material of the back seal member 41 and the end part seal members 42.

The back seal member 41 has a longitudinal direction in the first direction D1. Substantially all part of the back seal member 41 is squeezed and disposed between the regulating blade 3 and the facing part 10 in the third direction D3. The end part seal members 42 are respectively disposed at one end side and the other end side of the back seal member 41 in the first direction D1. In other words, there are two end part seal members 42. The end part seal member 42 is partially squeezed and disposed between the regulating blade 3 and the facing part 10 in the third direction D3. As the seal member 4 is disposed between the regulating blade 3 and the facing part 10 in the third direction D3, it is possible to prevent the toner from passing through in the second direction D2 between the regulating blade 3 and the facing part 10 in the third direction D3.

The end part seal members 42 respectively have first parts 421, which contact the outer circumferential surface of the developing roller 2 at the end parts in the first direction D1. One of the first parts 421 contacts the outer circumferential surface of the developing roller 2 at one end part in the first direction D1, and the other first part 421 contacts the outer circumferential surface of the developing roller 2 at the other end part in the first direction D1. Each of the first parts 421 contacts the outer circumferential surface of the developing roller 2 at the end part in the first direction D1, from a side opposite to the side on which the photosensitive drum 301 is disposed, with respect to the developing roller 2. In this way, it is possible to prevent the toner from leaking to the outside of the developing container 1 from the end side of the developing roller 2 in the first direction D1.

The end part seal members 42 respectively have second parts 422, which are disposed adjacent in the first direction D1 to end surfaces of the back seal member 41 in the first direction D1. One of the second parts 422 is disposed adjacent in the first direction DI to one end surface of the back seal member 41 in the first direction D1. The other second part 422 is disposed adjacent in the first direction D1 to the other end surface of the back seal member 41 in the first direction D1. In other words, the back seal member 41 is sandwiched between the pair of second parts 422 in the first direction D1. The second parts 422 of the end part seal members 42 are partially squeezed and disposed between the regulating blade 3 and the facing part 10 in the third direction D3.

Placement of Resin Member

Figure 12:
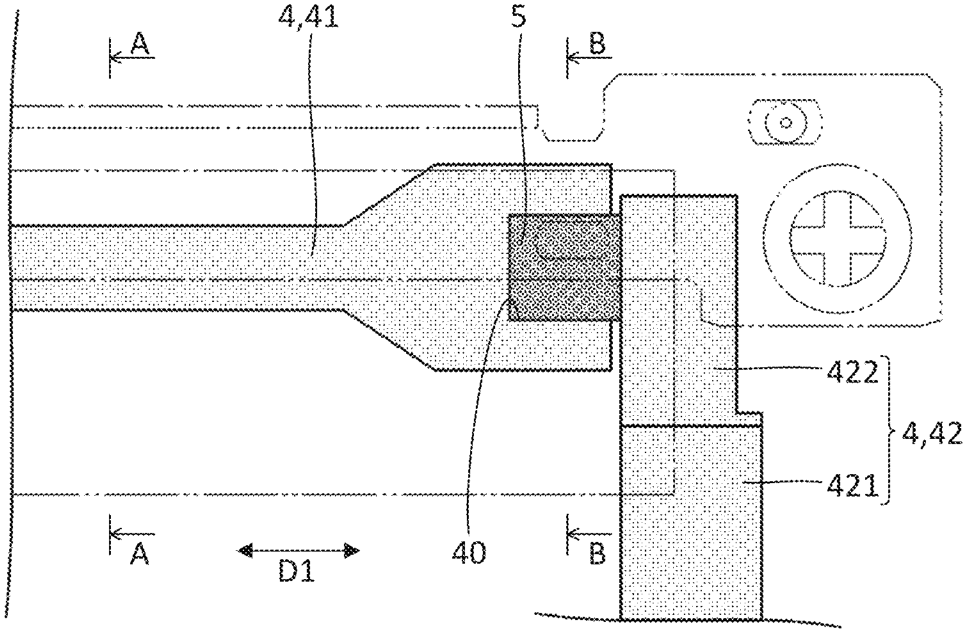
FIG. 12 is a schematic diagram illustrating a positional relationship between the seal member illustrated in FIG. 10 and a resin member.
Figure 13:
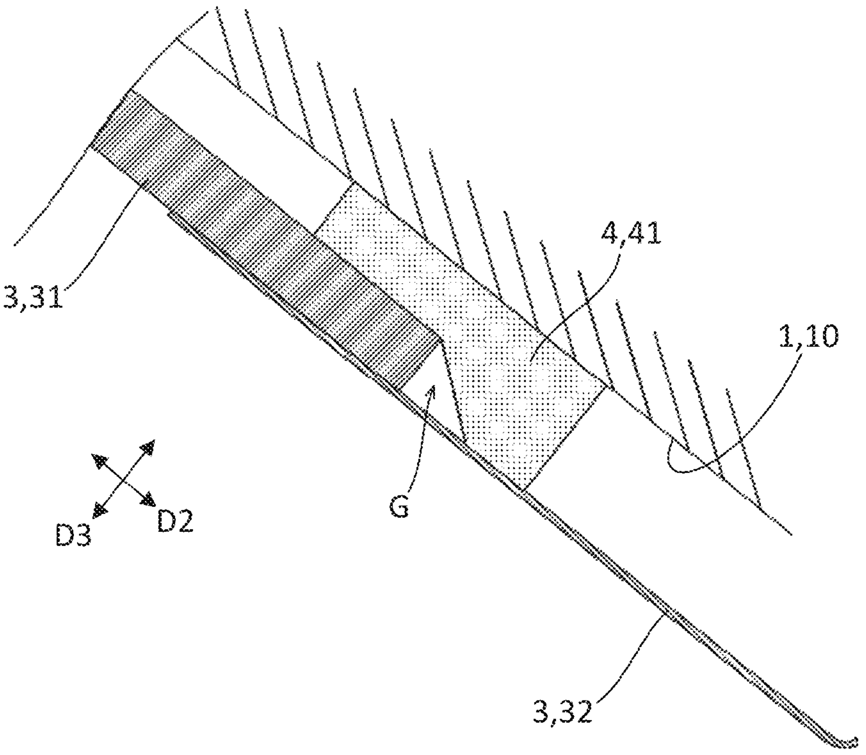
FIG. 13 is a diagram schematically illustrating a cross section along A-A line in FIG. 12.
Figure 14:
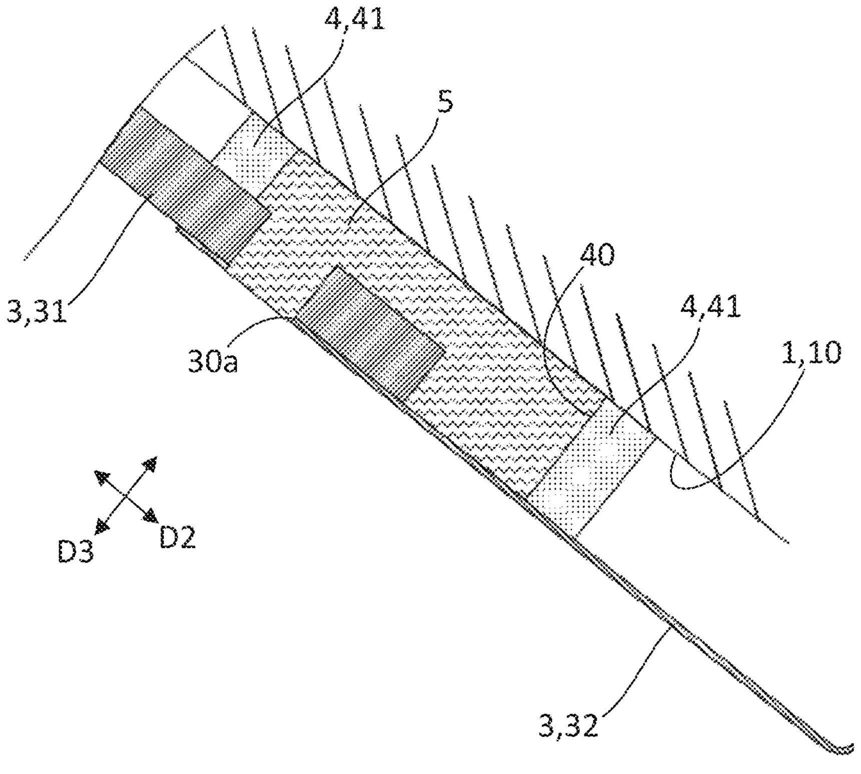
FIG. 14 is a diagram schematically illustrating a cross section along B-B line in FIG. 12.

As illustrated in FIGS. 12 to 14, the developing device 100 includes a resin member 5 to seal a gap G generated between the regulating blade 3 and the facing part 10. The specific description is given below. Note that FIG. 13 schematically illustrates a cross section along A-A line in FIG. 12, and FIG. 14 schematically illustrates a cross section along B-B line in FIG. 12.

Between the mounting plate 31 and the facing part 10 in the third direction D3, the compression amount of the back seal member 41 is larger than that between the blade plate 32 and the facing part 10 in the third direction D3. In this way, the gap G extending in the first direction D1 is generated in a part of the back seal member 41 around the step part 30. The gap G is generated due to the thickness difference between the mounting plate 31 and the blade plate 32.

The toner in the developing container 1 may be collected in the gap G. If the toner is collected in the gap G, the toner may move along the gap G in the first direction D1. If there is not the resin member 5, the toner moving along the gap G in the first direction D1 may be scattered from the end surface of the back seal member 41 in the first direction D1. In other words, a toner passage may be formed from the end surface of the back seal member 41 in the first direction D1 to the outside via the gap G. As a result, the toner may leak from the inside to the outside of the developing container 1.

In order to suppress such an inconvenience, the toner passage via the gap G is sealed by the resin member 5. The resin member 5 is formed by curing liquid resin. For instance, a constituent material of the resin member 5 is a thermoplastic resin called hot melt or the like, though this is not a limitation. The constituent material of the resin member 5 may be a thermosetting resin.

The resin member 5 is disposed in an area defined by the constituent material of the seal member 4. In other words, the seal member 4 has a resin placement area 40. The resin member 5 is disposed in the resin placement area 40. The resin placement area 40 is an area that penetrates the seal member 4 in the third direction D3 and is surrounded by the constituent material of the seal member 4 from the first direction D1 and the second direction D2. The resin placement area 40 is disposed at each of one end part and the other end part of the seal member 4 in the first direction D1.

Figure 9:
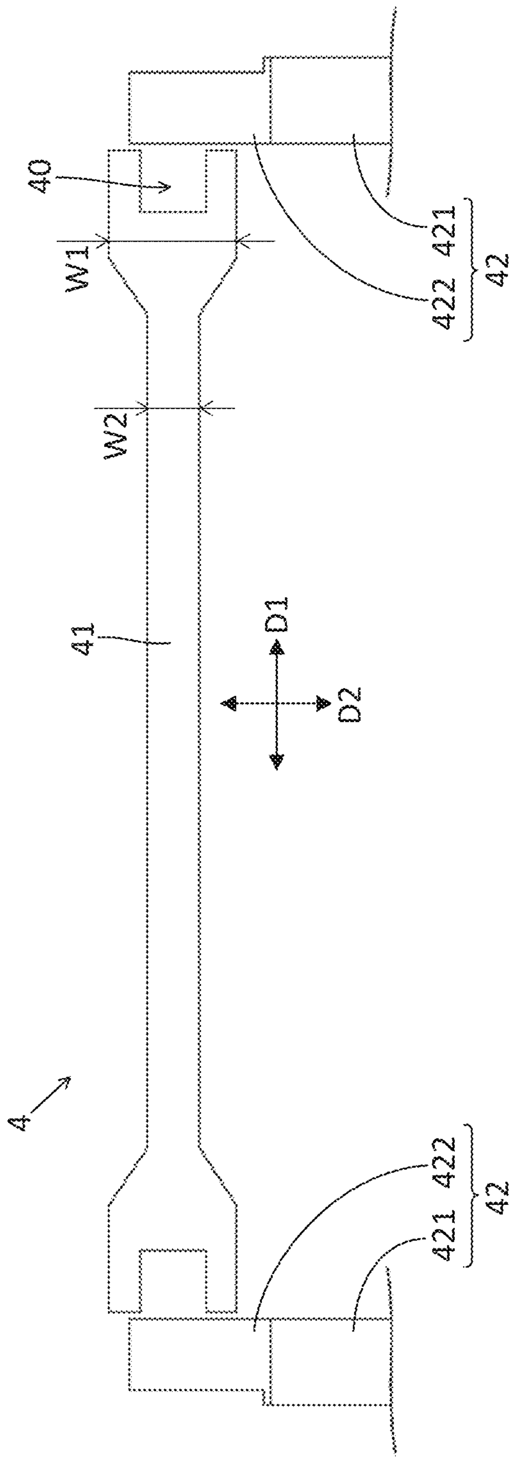
FIG. 9 is a plan view of the seal member according to one embodiment.
Figure 10:
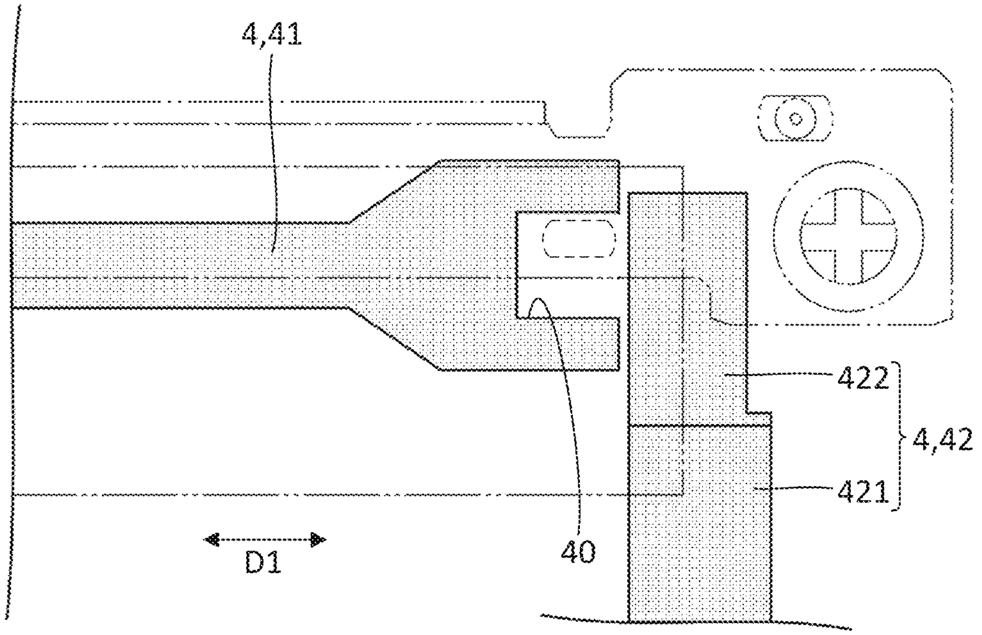
FIG. 10 is a schematic diagram of an end part and its vicinity of the seal member in a first direction according to one embodiment.
Figure 11:
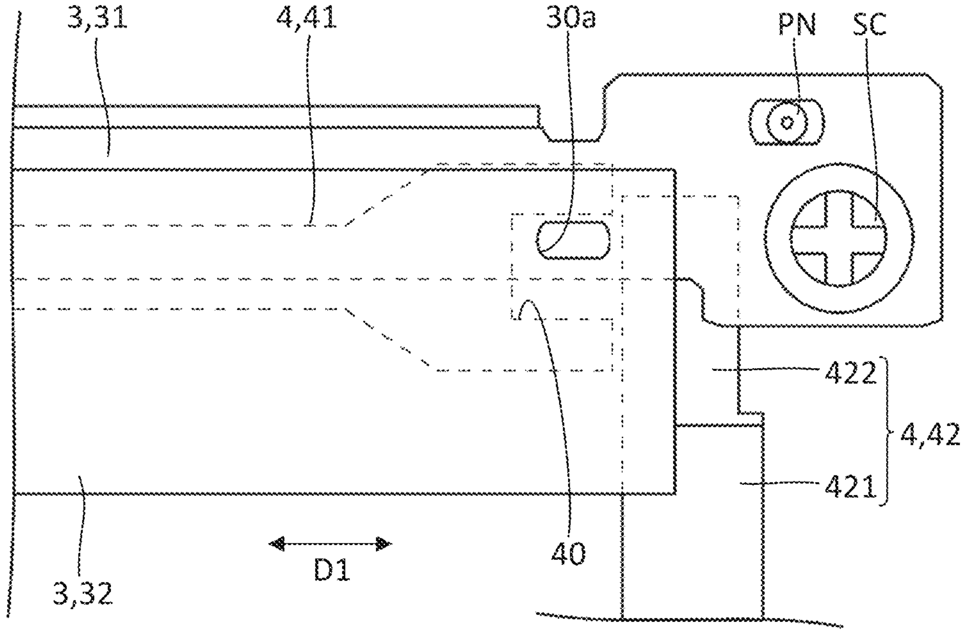
FIG. 11 is a schematic diagram illustrating a positional relationship between the seal member illustrated in FIG. 10 and the regulating blade.

Specifically, the back seal member 41 has recesses respectively at one end part and the other end part in the first direction D1, each of which is recessed from the end surface in the first direction D1 inward in the first direction D1, and penetrates in the third direction D3 (see FIG. 9). Each recess opening on each of one side and the other side in the first direction D1 of the back seal member 41 is covered by the end surface in the first direction D1 of the end part seal member 42 disposed on the same side (i.e., the end surface of the second part 422 in the first direction D1). The resin placement area 40 is constituted of an area surrounded by the inner wall surface of the recess of the back seal member 41 and the end surface of the end part seal member 42 in the first direction D1.

In addition, the resin placement area 40 is sealed by the regulating blade 3 from one side in the third direction D3. Further, the resin placement area 40 is disposed at a position overlapping the step part 30. Note that the other side of the resin placement area 40 in the third direction D3 is sealed by the facing part 10.

A process for manufacturing the developing device 100 includes the step of attaching the regulating blade 3 to the developing container 1. In the step of attaching the regulating blade 3 to the developing container 1, the seal member 4 is disposed first between the regulating blade 3 and the facing part 10 in the third direction D3, so that the resin placement area 40 overlaps the step part 30. Next, the regulating blade 3 is attached to the developing container 1 (i.e., using the fastening member SC, the regulating blade 3 is fastened to the developing container 1), so that the seal member 4 is squeezed in the third direction D3. Next, the liquid resin is filled and cured in the resin placement area 40 so as to form the resin member 5. When the liquid resin is filled in the resin placement area 40, a through hole 30*a* of the regulating blade 3 is used as an inlet for filling the liquid resin into the resin placement area 40. In this way, the resin member 5 disposed in the resin placement area 40 can be obtained.

In this embodiment, the resin placement area 40 is disposed in the seal member 4, so as to dispose the resin member 5 in the resin placement area 40, and hence the toner passage from the end surface of the back seal member 41 in the first direction D1 to the outside via the gap G is closed. In this way, even if the toner is collected in the gap G, the toner is prevented from moving through the gap G and scattering from the end surface of the back seal member 41 in the first direction D1. In other words, it is possible to prevent the toner from leaking to the outside through the gap G between the regulating blade 3 and the seal member 4. As a result, it is possible to prevent the toner from leaking from the inside to the outside of the developing container 1.

Because the leakage of the toner from the inside to the outside of the developing container 1 is suppressed, it is possible to suppress contamination of the inside of the image forming apparatus 1000 by the toner. In addition, it is possible to prevent the toner from leaking inside of the apparatus and adhering to the sheet. In other words, contamination of the sheet can be suppressed.

In addition, in this embodiment, because the resin placement area 40 is disposed in the seal member 4, the developing container 1 is not required to have a shape for disposing the resin member 5. In this way, the resin member 5 can easily be disposed. In other words, with a simple structure, the toner can be prevented from leaking from the inside to the outside of the developing container 1.

Further, in this embodiment, because the resin placement area 40 in which the liquid resin to be the resin member 5 is filled (i.e., the resin placement area 40 in which the resin member 5 is disposed) is formed only in the end parts of the seal member 4, the use amount of the liquid resin to be the resin member 5 can be reduced. By reducing the use amount of the liquid resin, the liquid resin can be quickly cured. In addition, by reducing the use amount of the liquid resin, the cost can be reduced.

Here, in this embodiment, the through hole 30*a* is formed in the regulating blade 3 so as to penetrate in the third direction D3. The through hole 30*a* is formed at a position overlapping the resin placement area 40. The through hole 30*a* functions as the inlet for filling the liquid resin to be the resin member 5. In the step of disposing the resin member 5 in the resin placement area 40, the liquid resin to be the resin member 5 is filled into the resin placement area 40 through the through hole 30*a*. In other words, after attaching the regulating blade 3 to the developing container 1, the resin member 5 is disposed in the resin placement area 40. In this way, the resin member 5 can easily be disposed in the resin placement area 40.

Note that the through hole 30*a* is constituted of a first through hole (without a reference numeral) formed in the mounting plate 31 and a second through hole (without a reference numeral) formed in the blade plate 32. The first through hole and the second through hole are used in the step of joining the mounting plate 31 to the blade plate 32. In the step of joining the mounting plate 31 to the blade plate 32, the first through hole and the second through hole function as positioning holes. In other words, in the step of joining the mounting plate 31 to the blade plate 32, a positioning pin is inserted into the first through hole and the second through hole, and in this state the blade plate 32 is welded to the mounting plate 31.

In addition, in this embodiment, because the resin placement area 40 is formed as an area surrounded by the inner wall surface of the recess in the back seal member 41 and the end surface of the end part seal member 42 in the first direction D1, even if there is a gap between the back seal member 41 and the end part seal member 42 in the first direction D1, the liquid resin filled in the resin placement area 40 enters the gap between the back seal member 41 and the end part seal member 42 in the first direction D1, and is cured so as to seal the gap. In this way, it is possible to prevent the toner from leaking through the gap between the back seal member 41 and the end part seal member 42 in the first direction D1. As a result, it is possible to further prevent the toner from leaking from the inside to the outside of the developing container 1.

In addition, in this embodiment, the end part of the back seal member 41 in the first direction D1 has a larger width in the second direction D2 than other part (see FIG. 9). In this way, the resin placement area 40 can easily be formed in the end part of the back seal member 41 in the first direction D1. In FIG. 9, the width in the second direction D2 of the end part of the back seal member 41 in the first direction D1 is denoted by W1, and the width in the second direction D2 of the other part is denoted by W2.

Further, in this embodiment, the resin placement area 40 is disposed at a position not overlapping the fastening hole 31*a* and the positioning hole 31*b*. In this way, the regulating blade 3 is appropriately fastened and positioned to the developing container 1.

The embodiment disclosed herein is merely an example in every aspect, and should not be interpreted as a limitation. The scope of the present disclosure is defined not by the above description of the embodiment but by the claims, and includes all modifications within the meaning and scope equivalent to the claims.

What is claimed is:

1. A developing device comprising:

a developing container configured to store developer containing toner;

a developing roller supported by the developing container in a rotatable manner about an axis extending in parallel to a first direction, so as to feed the toner to an image carrier by carrying the toner on its outer circumferential surface and rotating;

a regulating blade attached to the developing container, the regulating blade having a plate-like shape whose longitudinal direction is the first direction, the regulating blade allowing an end part opposite to the side attached to the developing container to make a surface contact with the outer circumferential surface of the developing roller, so as to regulate thickness of the toner layer formed on the outer circumferential surface of the developing roller;

a seal member made of elastic material so as to seal a gap between the developing container and the regulating blade; and a resin member formed by curing liquid resin, wherein the regulating blade includes a mounting plate attached to the developing container, and a blade plate made of a sheet material thinner than the mounting plate, the blade plate is joined to one surface of the mounting plate, and protrudes from the mounting plate in a second direction parallel to the one surface and perpendicular to the first direction, so as to make a surface contact with the outer circumferential surface of the developing roller, the developing container has a facing part that faces a step part of the regulating blade, which includes a step due to a thickness of the mounting plate, in a third direction perpendicular to the first direction and the second direction, the seal member has a resin placement area in which the resin member is disposed, at an end part in the first direction, and is squeezed and disposed between the regulating blade and the facing part in the third direction, the resin placement area is an area that penetrates the seal member in the third direction and is surrounded by a constituent material of the seal member from the first direction and the second direction, the resin placement area is disposed at a position overlapping the step part, the seal member includes a back seal member whose longitudinal direction is the first direction, and an end part seal member adjacent in the first direction to an end surface of the back seal member in the first direction, the back seal member has a recess that recesses from the end surface in the first direction inward in the first direction, and penetrates in the third direction, and the resin placement area is an area surrounded by an inner wall surface of the recess and the end surface of the end part seal member in the first direction.

2. The developing device according to claim 1, wherein the regulating blade has a through hole penetrating in the third direction, at a position overlapping the resin placement area.

3. The developing device according to claim 1, wherein an end part of the back seal member in the first direction has a larger width in the second direction than other part.

4. The developing device according to claim 1, wherein the regulating blade has a fastening part for fastening to the developing container using a fastening member, and a positioning part for positioning to the developing container, and the resin placement area is disposed at a position not overlapping the fastening part and the positioning part.

5. The developing device according to claim 1, wherein the developer is nonmagnetic one-component developer containing only nonmagnetic toner.

6. An image forming apparatus comprising the developing device according to claim 1.

7. A method for manufacturing a developing device including:

a developing container configured to store developer containing toner;

a developing roller supported by the developing container in a rotatable manner about an axis extending in parallel to a first direction, so as to feed the toner to an image carrier by carrying the toner on its outer circumferential surface and rotating;

a regulating blade attached to the developing container, the regulating blade having a plate-like shape whose longitudinal direction is the first direction, the regulating blade allowing an end part opposite to the side attached to the developing container to make a surface contact with the outer circumferential surface of the developing roller, so as to regulate thickness of the toner layer formed on the outer circumferential surface of the developing roller;

a seal member made of elastic material so as to seal a gap between the developing container and the regulating blade; and a resin member formed by curing liquid resin, wherein the regulating blade includes a mounting plate attached to the developing container, and a blade plate made of a sheet material thinner than the mounting plate, the blade plate is joined to one surface of the mounting plate, and protrudes from the mounting plate in a second direction parallel to the one surface and perpendicular to the first direction, so as to make a surface contact with the outer circumferential surface of the developing roller, the developing container has a facing part that faces a step part of the regulating blade, which includes a step due to a thickness of the mounting plate, in a third direction perpendicular to the first direction and the second direction, and wherein the method comprises the steps of:

disposing the seal member between the regulating blade and the facing part in the third direction, so that the seal member has a resin placement area in which the resin member is disposed, at an end part in the first direction, that the resin placement area is an area that penetrates the seal member in the third direction and is surrounded by a constituent material of the seal member from the first direction and the second direction, that the regulating blade has a through hole, penetrating in the third direction, at a position overlapping the resin placement area, and that the resin placement area overlaps the step part;

squeezing the seal member in the third direction by attaching the regulating blade to the developing container; and forming the resin member by filling and curing the liquid resin in the resin placement area through the through hole.

8. The method according to claim 7, wherein the seal member includes a back seal member whose longitudinal direction is the first direction, and an end part seal member adjacent in the first direction to an end surface of the back seal member in the first direction, the back seal member has a recess that recesses from the end surface in the first direction inward in the first direction, and penetrates in the third direction, and the resin placement area is an area surrounded by an inner wall surface of the recess and the end surface of the end part seal member in the first direction.

* * * * *